(12) United States Patent
Chen et al.

(10) Patent No.: US 12,120,732 B2
(45) Date of Patent: Oct. 15, 2024

(54) RANDOM ACCESS METHOD AND APPARATUS, AND USER EQUIPMENT

(71) Applicant: VIVO MOBILE COMMUNICATION CO., LTD., Guangdong (CN)

(72) Inventors: Xiaohang Chen, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 365 days.

(21) Appl. No.: 17/511,791

(22) Filed: Oct. 27, 2021

(65) Prior Publication Data

US 2022/0053554 A1    Feb. 17, 2022

Related U.S. Application Data

(63) Continuation of application No. PCT/CN2020/087403, filed on Apr. 28, 2020.

(30) Foreign Application Priority Data

Apr. 29, 2019   (CN) .......................... 201910357555.4

(51) Int. Cl.
*H04W 74/00*    (2009.01)
*H04W 72/0446*   (2023.01)
(Continued)

(52) U.S. Cl.
CPC ..... *H04W 74/006* (2013.01); *H04W 72/0446* (2013.01); *H04W 74/0833* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 2013/0242730 A1* | 9/2013 | Pelletier | H04W 74/0833 370/230 |
| 2013/0301486 A1 | 11/2013 | Kishiyama | |
| 2019/0104552 A1* | 4/2019 | Hui | H04W 48/10 |
| 2019/0174550 A1* | 6/2019 | Huang | H04W 72/12 |

(Continued)

FOREIGN PATENT DOCUMENTS

| | | |
|---|---|---|
| CN | 103392368 A | 11/2013 |
| WO | 2013109049 A1 | 7/2013 |
| WO | 2013113158 A1 | 8/2013 |

OTHER PUBLICATIONS

Convida Wireless, "Summary of Remaining details on PRACH formats", 3GPP TSG RAN WG1 Meeting #93, R1-1807632, Busan, Korea, May 21-25, 2018.

(Continued)

*Primary Examiner* — Anh Vu H Ly
(74) *Attorney, Agent, or Firm* — Price Heneveld LLP

(57) ABSTRACT

This disclosure provides a random access method and apparatus, and user equipment, and belongs to the field of wireless communications technologies. The random access method is applied to user equipment and includes: in a case that a time domain resource for a random access message conflicts with a time domain resource indicated by a network-side message, performing any one of the following: transmitting the random access message on the time domain resource for the random access message; canceling transmission of the random access message; delaying transmission of the random access message; and ignoring the network-side message.

9 Claims, 3 Drawing Sheets

In a case that a time domain resource for a random access message conflicts with a time domain resource indicated by a network-side message, perform any one of the following: transmitting the random access message on the time domain resource for the random access message; canceling transmission of the random access message; delaying transmission of the random access message; and ignoring the network-side message

— 101

(51) Int. Cl.
*H04W 74/08* (2009.01)
*H04W 74/0833* (2024.01)

(56) References Cited

U.S. PATENT DOCUMENTS

| | | | |
|---|---|---|---|
| 2020/0178263 A1* | 6/2020 | Shao | H04W 72/12 |
| 2021/0022186 A1* | 1/2021 | Liu | H04W 72/0446 |
| 2021/0136826 A1* | 5/2021 | Chang | H04W 74/0833 |
| 2021/0195635 A1* | 6/2021 | Wänstedt | H04W 74/085 |
| 2021/0345422 A1* | 11/2021 | Chen | H04W 72/044 |
| 2021/0360708 A1* | 11/2021 | Chen | H04W 74/0841 |
| 2021/0360709 A1* | 11/2021 | Chen | H04W 52/146 |
| 2022/0046604 A1* | 2/2022 | Zhang | H04L 5/0037 |
| 2023/0262663 A1* | 8/2023 | Liu | H04W 72/02 370/329 |

OTHER PUBLICATIONS

Huawei, "Discussion on channel structure of 2-step RACH", 3GPP TSG RAN WGI Meeting #99, RI-1911871, Reno, USA, Nov. 18-22, 2019.

Motorola Mobility, "Discussion on valid RACH occasions", 3GPP TSG RAN WG1 Meeting #93, R1-1807274, Busan, Korea, May 2P1-251h, 2018.

"3rd Generation Partnership Project; Technical Specification Group Radio Access Network; NR; Physical layer procedures for control (Release 15)", 3GPP TS 38.213 V15.1.0(Mar. 2018), Valbonne, France.

Vivo, "UL inter-UE Tx prioritization for URLLC", 3GPP TSG RAN WG1 #96bis, R1-1904085, Apr. 8-12, 2019, Xi'an, China.

* cited by examiner

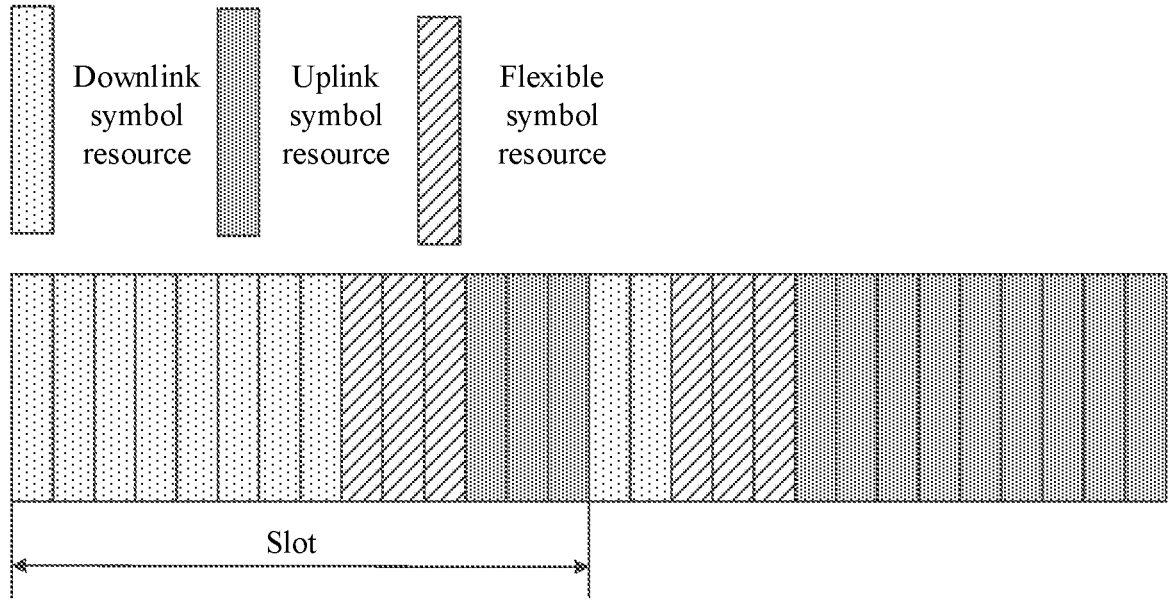

FIG. 3

In a case that a time domain resource for a random access message conflicts with a time domain resource indicated by a network-side message, perform any one of the following: transmitting the random access message on the time domain resource for the random access message; canceling transmission of the random access message; delaying transmission of the random access message; and ignoring the network-side message  ⁓101

FIG. 4

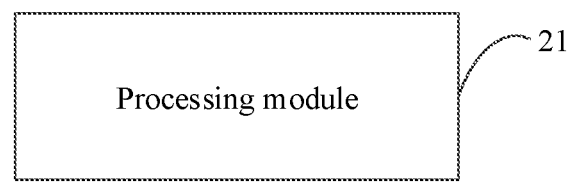

FIG. 5

RANDOM ACCESS METHOD AND APPARATUS, AND USER EQUIPMENT

CROSS-REFERENCE TO RELATED APPLICATIONS

This application is a continuation application of PCT Application No. PCT/CN2020/087403 filed on Apr. 28, 2020, which claims priority to Chinese Patent Application No. 201910357555.4, filed in China on Apr. 29, 2019, disclosures of which are incorporated herein by reference in their entireties.

TECHNICAL FIELD

This disclosure relates to the field of wireless communications technologies, and in particular, to a random access method and apparatus, and user equipment.

BACKGROUND

In an uplink transmission mode in the related art, for user equipment (UE) to transmit uplink data, the user equipment needs to firstly obtains uplink synchronization information through a random access procedure, that is, to obtain uplink timing advance (TA) information from a network side. After the uplink synchronization information is obtained, the UE may transmit the uplink data through dynamic scheduling or semi-static scheduling.

In a two-step random access channel (RACH) procedure, the UE transmits a msgA to a network-side device. After receiving the msgA, the network-side device transmits a msgB to the UE. After the UE receives the msgB, two-step random access is completed.

In a time division duplexing (TDD) scenario, for one transmission occasion, a transmission direction is determined based on TDD configuration information configured by the network side. When the network side configures, for the UE, a transmission occasion for transmitting the msgA, the transmission occasion of the msgA may conflict with the TDD configuration information configured by the network side. If the UE transmits the msgA in a conflicting time domain location, interference may be caused to downlink signal transmission of the network side.

SUMMARY

According to a first aspect, an embodiment of this disclosure provides a random access method, applied to user equipment and including:

in a case that a time domain resource for a random access message conflicts with a time domain resource indicated by a network-side message, performing any one of the following:

transmitting the random access message on the time domain resource for the random access message;

canceling transmission of the random access message; or delaying transmission of the random access message.

According to a second aspect, an embodiment of this disclosure provides a random access apparatus, applied to user equipment and including:

a processing module, configured to: in a case that a time domain resource for a random access message conflicts with a time domain resource indicated by a network-side message, perform any one of the following:

transmitting the random access message on the time domain resource for the random access message;

canceling transmission of the random access message; or delaying transmission of the random access message.

According to a third aspect, an embodiment of this disclosure provides user equipment, including a memory, a processor, and a computer program stored in the memory and capable of running on the processor. When the computer program is executed by the processor, the steps in the foregoing random access method are implemented.

According to a fourth aspect, an embodiment of this disclosure provides a computer-readable storage medium, where the computer-readable storage medium stores a computer program, and when the computer program is executed by a processor, the steps of the foregoing random access method are implemented.

BRIEF DESCRIPTION OF DRAWINGS

FIG. 3 is a schematic diagram of a time domain resource included in a slot;

FIG. 4 is a flow diagram of a random access method applied to user equipment according to an embodiment of this disclosure;

FIG. 5 is a structural diagram of a random access apparatus applied to user equipment according to an embodiment of this disclosure.

DESCRIPTION OF EMBODIMENTS

Figure 1:
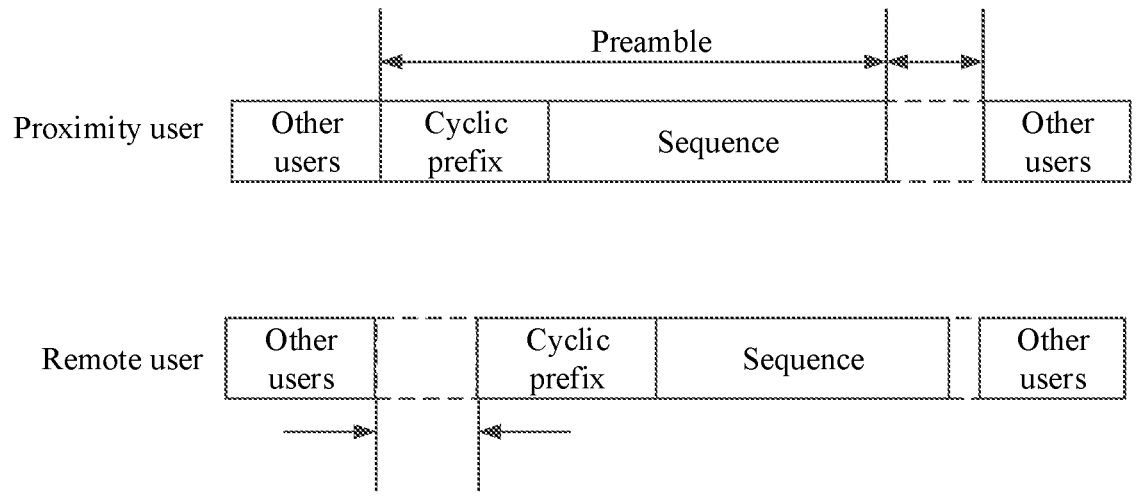
FIG. 1 is a schematic diagram of adding a cyclic prefix to a preamble.

To make the to-be-resolved technical problems, technical solutions, and advantages of the embodiments of this disclosure clearer, the following provides detailed descriptions with reference to the accompanying drawings and specific embodiments.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" are usually used interchangeably. The CDMA system may implement radio technologies such as CDMA2000 and universal terrestrial radio access (UTRA). UTRA includes wideband CDMA (Wideband Code Division Multiple Access, WCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (for example, LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Compared with previous mobile communications systems, future mobile communications systems need to adapt to more diversified scenarios and business requirements. Main scenarios of new radio (NR) include: enhanced mobile broadband (eMBB), massive machine type communications (mMTC), and ultra-reliable and low latency communication (URLLC). These scenarios require the systems to have high reliability, low latency, large bandwidth, wide coverage, and the like.

In a conventional uplink transmission mode, if user equipment (UE) needs to transmit uplink data, it firstly obtains uplink synchronization information through a random access procedure, that is, obtains uplink timing advance (TA) information from a network side. After the uplink synchronization information is obtained, the UE may transmit the uplink data through dynamic scheduling or semi-static scheduling.

In a case that an uplink data packet is small, the manner that the UE transmits the uplink data after obtaining the uplink synchronization information through the random access procedure may lead to resource consumption and power consumption. Therefore, in the mMTC scenario, the UE may transmit the uplink data in an asynchronous state.

Similar to the random access procedure, the UE is also in an asynchronous state when transmitting a random access preamble. Therefore, as shown in FIG. 1, impact of transmission delay needs to be offset by adding a cyclic prefix (CP) to the preamble.

Figure 2:
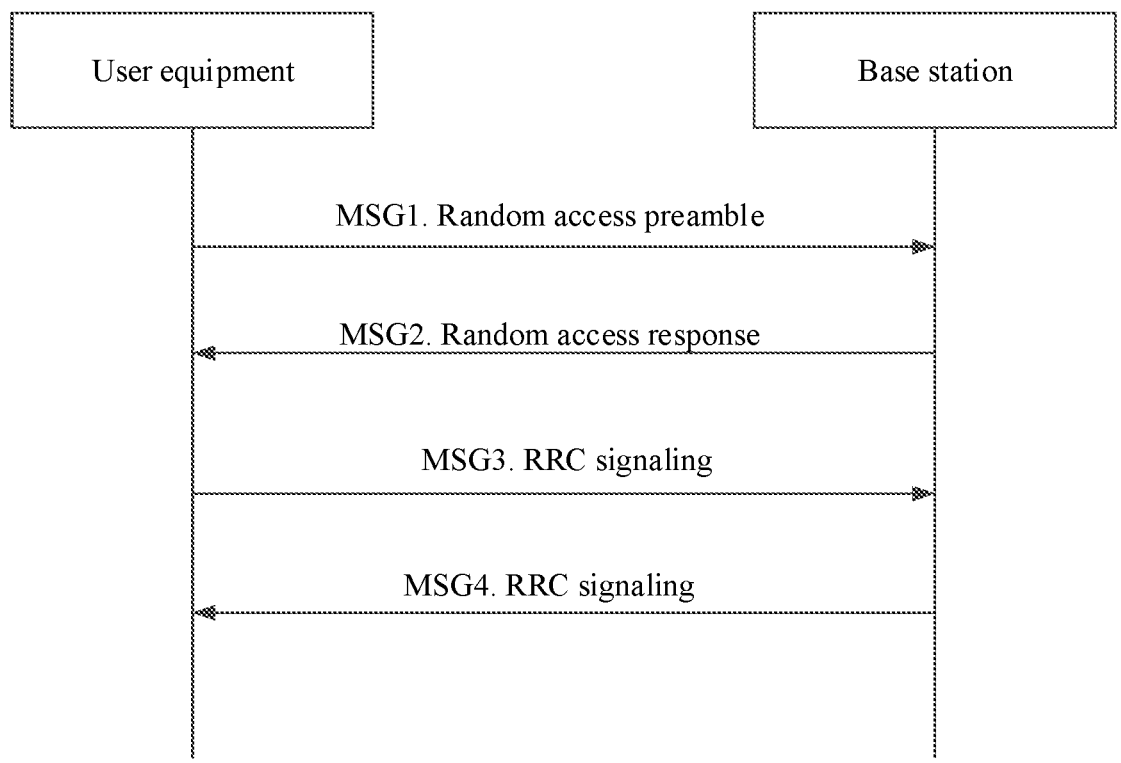
FIG. 2 is a schematic diagram of a four-step random access procedure.

In a four-step random access channel (RACH) procedure, as shown in FIG. 2, UE firstly transmits, to a network-side device (for example, a base station), a msg1 including a preamble. After detecting the preamble, the network-side device transmits a msg2 including a random access response (RAR) message corresponding to the preamble. After receiving the msg2, the UE transmits a msg3 based on an indication of RAR. After receiving the msg3, the network-side device transmits a msg4 including a contention resolution ID. After the UE receives the msg4, the four-step random access is completed.

In a two-step RACH procedure, UE transmits a msgA to a network-side device. After receiving the msgA, the network-side device transmits a msgB to the UE. After the UE receives the msgB, the two-step random access is completed.

As shown in FIG. 3, a slot may include downlink, uplink, and flexible orthogonal frequency division multiplexing (OFDM) symbols, where the flexible symbols may be rewritten into downlink or uplink symbols.

A slot format indicator (SFI) may indicate one or more slot formats. The SFI is transmitted in a group common (GC)-PDCCH. The SFI can flexibly change a slot format, to meet a service transmission requirement. The UE determines, based on an indication of the SFI, whether to monitor a physical downlink control channel (PDCCH).

The base station may configure, for the UE, one or more cell-specific slot formats in a semi-static manner through higher layer parameters UL-DL-configuration-common and UL-DL-configuration-common-Set2 (optional). The base station may also configure, for the UE, one or more UE-specific slot formats in a semi-static manner through a higher layer parameter UL-DL-configuration-dedicated.

The base station may rewrite a flexible symbol or slot in semi-static configuration through the SFI carried in the GC-PDCCH.

Transmission directions implicitly indicated by UE-specific RRC configuration are collectively called measurement, including:

periodic or semi-static CSI-RS measurement configured by UE-specific RRC signaling, periodic CSI reporting, an uplink/downlink transmission direction implicitly indicated by a periodic or semi-static sounding reference signal (SRS), a PRACH resource configured in UE-specific RRC, and type1 and type2 grant-free uplink transmission.

For the type2 grant-free uplink transmission, only transmission on the first activated resource is regarded as UE-specific data.

UE-specific transmission includes a physical downlink shared channel (PDSCH), a physical uplink shared channel (PUSCH), a PDSCH A/N feedback, aperiodic measurement triggered by downlink control information (DCI), and the like.

In a time division duplex (TDD) scenario, for a transmission occasion, a transmission direction is determined based on TDD configuration information configured by the network side. When the network side configures, for the UE, a transmission occasion for transmitting the msgA, the transmission occasion of the msgA may conflict with the TDD configuration information configured by the network side. If the UE transmits the msgA in a conflicting time domain location, interference may be caused to downlink signal transmission of the network side.

To resolve the foregoing technical problem, embodiments of this disclosure provide a random access method and apparatus, and user equipment, so as to resolve a problem that during a random access procedure of user equipment, a transmission occasion of a random access message conflicts with a time domain resource indicated by a network-side message.

An embodiment of this disclosure provides a random access method, applied to user equipment. As shown in FIG. 4, the random access method includes the following step.

Step 101: In a case that a time domain resource for a random access message conflicts with a time domain resource indicated by a network-side message, perform any one of the following:

transmitting the random access message on the time domain resource for the random access message;

canceling transmission of the random access message;

delaying transmission of the random access message; or ignoring the network-side message.

In this embodiment, in a case that the time domain resource for the random access message conflicts with the time domain resource indicated by the network-side message, the random access message may be transmitted on the time domain resource for the random access message, or transmission of the random access message may be canceled, or transmission of the random access message may be delayed, or the network-side message may be ignored. This disclosure provides a specific solution to a conflict between a transmission occasion of a random access message and a transmission direction indicated by a network-side message in a TDD scenario. This can resolve a problem that during a random access procedure of user equipment, a transmission occasion of a random access message conflicts with a time domain resource indicated by a network-side message.

That the time domain resource for the random access message conflicts with the time domain resource indicated by the network-side message includes that the time domain resource for the random access message at least partially overlaps with at least one of the following resources indicated by the network-side message:

a downlink transmission resource; a downlink time domain resource; or a flexible time domain resource, where the time domain resource for the random access message may be pre-configured by the network side.

In a specific embodiment, the network-side message is downlink control information DCI, and the time domain resource indicated by the network-side message may be determined by slot format information indicated by the DCI, where the slot format information indicates which symbols are uplink time domain resources, which symbols are downlink time domain resources, and which symbols are flexible time domain resources. The time domain resource indicated by the network-side message may also be a time domain resource for downlink reception directly indicated by the DCI. When the time domain resource for downlink reception is indicated by the DCI, the DCI may be a downlink scheduling grant (DL grant).

Optionally, the ignoring the network-side message includes any one of the following:

discarding the DCI; and skipping receiving a downlink transmission signal, where the downlink transmission signal includes at least one of the following: a physical downlink control channel (PDCCH), a physical downlink shared channel (PDSCH), and a channel state information-reference signal (CSI-RS).

Specifically, in a case that the time domain resource for the random access message indicated by the DCI is a downlink transmission resource and/or a downlink time domain resource and/or a flexible time domain resource, the user equipment may ignore and discard the DCI after receiving the DCI.

In a specific embodiment, the canceling transmission of the random access message includes:

in a case that a time gap between a time domain resource for receiving the DCI and a time domain resource for transmitting the random access message is greater than or equal to a preset threshold, canceling transmission of the random access message, to prevent transmission of the random access message from conflicting with a transmission direction indicated by the network side. The preset threshold may be set based on an actual requirement.

Further, the foregoing random access method further includes:

in a case that the time gap between the time domain resource for receiving the DCI and the time domain resource for transmitting the random access message is not greater than the preset threshold, transmitting the random access message on the time domain resource for the random access message.

The time gap is duration from an end location of the time domain resource for receiving the DCI to any location of the time domain resource for transmitting the random access message.

Specifically, the time gap is duration from the end location of the time domain resource for receiving the DCI to any location that is before an end location of the time domain resource for the random access message.

The canceling transmission of the random access message may be canceling full transmission of the random access message, or may be canceling partial transmission of the random access message. In a case that a time gap between an end time of the time domain resource for receiving the DCI and a start time of the time domain resource for transmitting the random access message is greater than or equal to a preset threshold, full transmission of the random access message is canceled. In a case that a time gap between an end time of the time domain resource for receiving the DCI and any location that is before an end location of the time domain resource for transmitting the random access message is greater than or equal to the preset threshold, partial transmission of the random access message is canceled. A time gap between a start time of the canceled partial transmission of the random access message and an end time of the time domain resource for receiving the DCI is greater than or equal to the preset threshold.

In a specific embodiment, the delaying transmission of the random access message includes:

transmitting the random access message on a latest usable uplink time domain resource, where the available uplink time domain resource may be an uplink time domain resource indicated by DCI, so as to prevent transmission of the random access message from conflicting with a transmission direction indicated by a network side.

In another specific embodiment, the transmitting the random access message on the time domain resource for the random access message includes:

in a case that the time domain resource for the random access message is a flexible time domain resource indicated by a network-side message, transmitting the random access message on the time domain resource for the random access message.

In the foregoing embodiments, the random access message may be a random access message in the four-step random access procedure, or may be a random access message in the two-step random access procedure. Specifically, the random access message may be the msgA in the two-step random access procedure. The random access message includes at least one of a random access channel PRACH or an uplink data channel PUSCH.

In another specific embodiment, user equipment does not expect that a time domain resource for a random access message conflicts with a time domain resource for a network-side message. In other words, the user equipment may consider the network-side message wrong when receiving the network-side message and finding that the time domain resource indicated by the network-side message conflicts with the time domain resource for the random access message. In a specific example, in a case that DCI indicates that a time domain resource for a random access message is a downlink time domain resource or a flexible time domain resource, user equipment considers that an error occurs.

In the foregoing embodiment, the time domain resource for the random access message may be an uplink time domain resource, or may be a flexible time domain resource. In a specific example, if a time domain resource for a random access message is a flexible time domain resource, when DCI indicates that the time domain resource for the random access message is a downlink time domain resource or a flexible time domain resource, user equipment considers that an error occurs. In another specific example, when a time domain resource for a random access message is a flexible time domain resource, and UE does not detect DCI for indicating slot format information at the time when the UE should receive the DCI, if a time gap between this time and the time domain resource for transmitting the random access message is greater than or equal to a preset threshold, transmission of the random access message is canceled; otherwise, the random access message is transmitted on the time domain resource for the random access message.

The following further describes the technical solutions of this disclosure in combination with the specific embodiments.

Embodiment 1

In this embodiment, a network side configures UE to transmit a msgA PRACH and/or PUSCH on a group of symbol resources in a slot, and the UE detects a piece of DCI instructing that the UE receives a CSI-RS or PDSCH on symbol resources in the slot. The symbol resources indicated by the DCI and the symbol resources for transmitting the msgA PRACH and/or PUSCH by the UE overlap in terms of time.

In a specific example, if a time gap between an end location of a time domain resource on which DCI is detected and any symbol resource, for example, a symbol resource A, in a slot in which the msgA PRACH and/or PUSCH is transmitted is less than a preset threshold, UE does not cancel transmission of the msgA PRACH and/or PUSCH that is before the symbol resource A; and the UE cancels transmission of remaining msgA PRACH and/or PUSCH that starts from the symbol resource A.

In another specific example, in a preset time before an effective transmission opportunity of the msgA PRACH and/or PUSCH, for example, Ngap symbol resources, UE does not receive a PDCCH, PDSCH or CSI-RS that conflicts with symbol resources corresponding to the transmission opportunity of the msgA PRACH and/or PUSCH in a slot.

Embodiment 2

In this embodiment, a network side configures or instructs UE to transmit a msgA PRACH and/or PUSCH on a group of symbol resources in a slot, the UE detects a piece of DCI indicating slot format information, and the UE does not expect that a transmission direction of symbol resources indicated by the slot format information conflicts with that of the symbol resources for transmitting the msgA PRACH and/or PUSCH by the UE. For example, the UE does not expect that the symbol resources, indicated by the slot format information, for transmitting the msgA PRACH and/or PUSCH by the UE are downlink symbol resources.

Embodiment 3

In this embodiment, a network side configures or instructs UE to transmit a msgA PRACH and/or PUSCH on a group of symbol resources in a slot.

In a case that the symbol resources for transmitting the msgA PRACH and/or PUSCH are flexible resources indicated by semi-static TDD configuration information, or that no semi-static TDD configuration information is configured on the UE, when the UE detects a piece of DCI indicating slot format information, if symbol resources, indicated by the slot format information, for transmitting the msgA PRACH and/or PUSCH by the UE are flexible symbol resources, the UE transmits the msgA PRACH and/or PUSCH on time domain resources configured or indicated by the network side; or if the symbol resources, indicated by the slot format information, for transmitting the msgA PRACH and/or PUSCH by the UE are uplink symbol resources, the UE transmits the msgA PRACH and/or PUSCH on time domain resources configured or indicated by the network side; or the UE does not expect that symbol resources, indicated by the slot format information, for transmitting the msgA PRACH and/or PUSCH by the UE are downlink symbol resources, so that in a case that the symbol resources, indicated by the slot format information, for transmitting the msgA PRACH and/or PUSCH by the UE are downlink symbol resources, the UE considers that an error occurs; or the UE does not expect that symbol resources, indicated by the slot format information, for transmitting the msgA PRACH and/or PUSCH and PUSCH repetitions by the UE are downlink symbol resources or flexible symbol resources, so that in a case that the symbol resources, indicated by the slot format information, for transmitting the msgA PRACH and/or PUSCH and PUSCH repetitions by the UE are downlink symbol resources or flexible symbol resources, the UE considers that an error occurs.

Embodiment 4

In this embodiment, a network side configures or instructs UE to transmit a msgA PRACH and/or PUSCH on a group of symbol resources in a slot.

The UE detects a piece of DCI indicating slot format information, where the symbol resources, indicated by the slot format information, for transmitting the msgA PRACH and/or PUSCH by the UE are downlink symbol resources or flexible symbol resources; or the UE detects a piece of DCI instructing that the UE receives a CSI-RS or PDSCH on (some or all) symbol resources for transmitting the msgA PRACH and/or PUSCH.

If a time gap between an end location of a time domain resource at which the DCI is detected and any symbol resource in a slot in which the msgA PRACH and/or PUSCH is transmitted is less than a preset threshold, the UE does not cancel transmission of the msgA PRACH and/or PUSCH that is before the symbol resource; and the UE cancels transmission of remaining msgA PRACH and/or PUSCH that starts from the symbol resource.

Embodiment 5

In this embodiment, a network side configures or instructs UE to transmit a msgA PRACH and/or PUSCH on a group of symbol resources in a slot.

The symbol resources for transmitting the msgA PRACH and/or PUSCH are flexible resources indicated by semi-static TDD configuration information, or no semi-static TDD configuration information is configured on the UE, and the UE does not detect a piece of DCI indicating slot format information of a slot in which the msgA PRACH and/or PUSCH is transmitted.

If a time gap between an end location of a time domain resource at which DCI is detected (that is, an end location of a time domain resource on which DCI should be detected) and any symbol resource in a slot in which the msgA PRACH and/or PUSCH is transmitted is greater than or equal to a preset threshold, the UE cancels transmission of the msgA PRACH and/or PUSCH that starts from the symbol resource.

If a time gap between an end location of a time domain resource on which DCI is detected (that is, an end location of a time domain resource on which DCI should be detected) and any symbol resource in a slot in which the msgA PRACH and/or PUSCH is transmitted is less than a preset threshold, the UE does not expect to cancel transmission of the msgA PRACH and/or PUSCH that is before the symbol resource.

Embodiment 6

In this embodiment, a network side instructs UE to transmit a msgA PRACH and/or PUSCH on a group of symbol resources in a slot, and the UE detects a piece of DCI indicating slot format information.

If symbol resources, indicated by the slot format information, for transmitting the msgA PRACH and/or PUSCH by the UE are downlink symbol resources or flexible symbol resources, the UE delays transmission of the msgA PRACH and/or PUSCH to a next group of available uplink symbol resources.

In a TDD scenario, when the network side configures, for the UE, a transmission occasion for transmitting a msgA, the transmission occasion of the msgA may conflict with the TDD configuration information configured by the network side. Through the solutions of the foregoing embodiments, the UE can determine an effective msgA transmission occasion in a conflicting time domain location, avoiding causing interference to downlink signal transmission of the network side. In addition, a sufficient switching time gap between the transmission occasion for the UE to transmit the msgA and receiving of a downlink signal by the UE can be ensured, avoiding causing interference to downlink reception.

An embodiment of this disclosure further provides a random access apparatus, applied to user equipment. As shown in FIG. 5, the random access apparatus includes:

a processing module 21, configured to: in a case that a time domain resource for a random access message conflicts with a time domain resource indicated by a network-side message, perform any one of the following:

transmitting the random access message on the time domain resource for the random access message;
canceling transmission of the random access message;
delaying transmission of the random access message; or
ignoring the network-side message.

In this embodiment, in a case that the time domain resource for the random access message conflicts with the time domain resource indicated by the network-side message, the random access message may be transmitted on the time domain resource for the random access message, or transmission of the random access message may be canceled, or transmission of the random access message may be delayed, or the network-side message may be ignored. This disclosure provides a specific solution to a conflict between a transmission occasion of a random access message and a transmission direction indicated by a network-side message in a TDD scenario. This can resolve a problem that during a random access procedure of user equipment, a transmission occasion of a random access message conflicts with a time domain resource indicated by a network-side message.

Further, that a time domain resource for a random access message conflicts with a time domain resource indicated by a network-side message includes:

that the time domain resource for the random access message at least partially overlaps with at least one of the following resources indicated by the network-side message:

a downlink transmission resource; a downlink time domain resource; or a flexible time domain resource.

In a specific embodiment, the network-side message is DCI.

Further, the processing module is specifically configured to perform any one of the following:

discarding the DCI; and
skipping receiving a downlink transmission signal.

Further, the processing module 21 is specifically configured to cancel, in a case that a time gap between a time domain resource for receiving the DCI and a time domain resource for transmitting the random access message is greater than or equal to a preset threshold, transmission of the random access message.

Further, the processing module 21 is further configured to: in a case that the time gap between the time domain resource for receiving the DCI and the time domain resource for transmitting the random access message is not greater than the preset threshold, transmit the random access message on the time domain resource for the random access message.

Further, the time gap is duration from an end location of the time domain resource for receiving the DCI to any location of the time domain resource for transmitting the random access message.

Further, the processing module 21 is specifically configured to transmit the random access message on a latest usable uplink time domain resource.

Further, the processing module 21 is specifically configured to transmit, in a case that the time domain resource for the random access message is a flexible time domain resource indicated by the network-side message, the random access message on the time domain resource for the random access message.

Further, the random access message includes at least one of a random access channel PRACH or an uplink data channel PUSCH.

An embodiment of this disclosure further provides user equipment, including a memory, a processor, and a computer program stored in the memory and capable of running on the processor. When the computer program is executed by the processor, the steps in the foregoing random access method are implemented.

Figure 6:
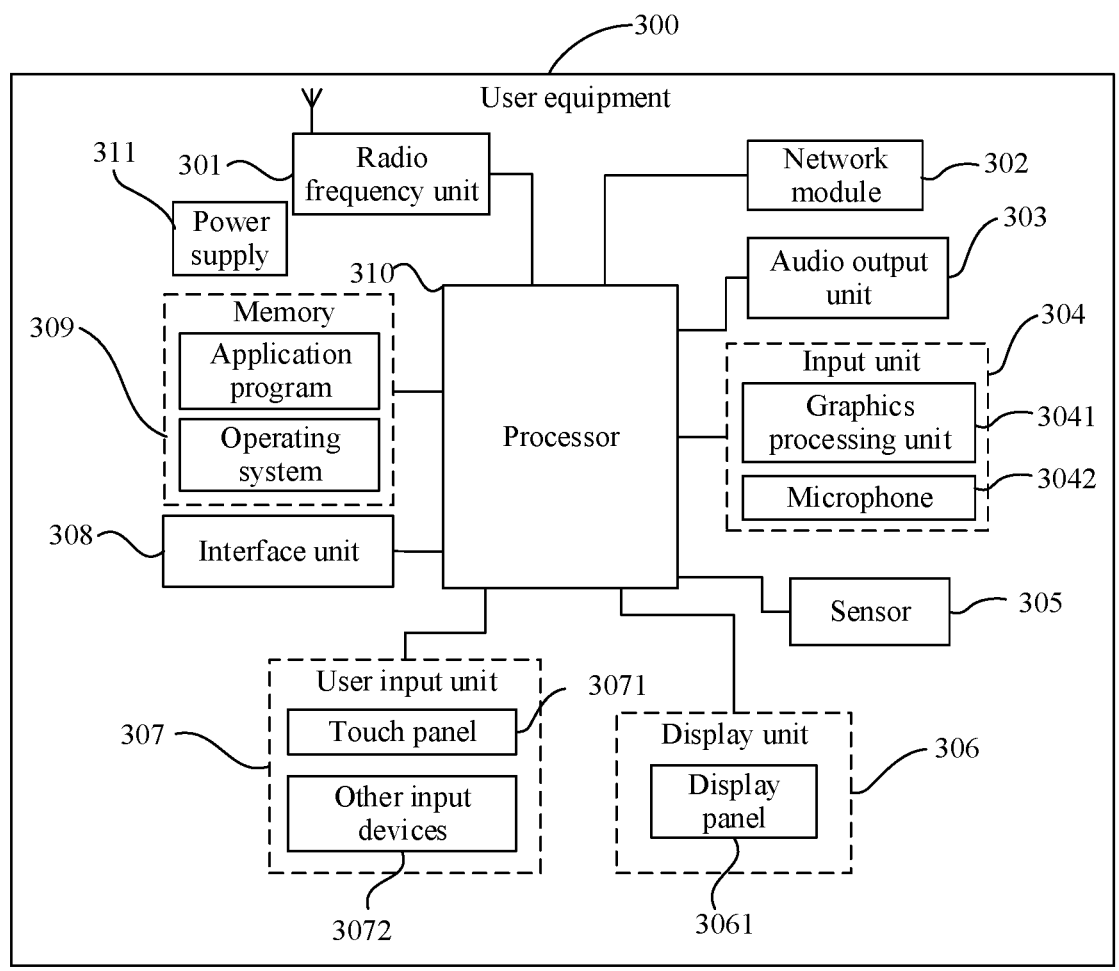
FIG. 6 is a schematic diagram of composition of user equipment according to an embodiment of this disclosure.

As shown in FIG. 6, the user equipment 300 includes but is not limited to: a radio frequency unit 301, a network module 302, an audio output unit 303, an input unit 304, a sensor 305, a display unit 306, a user input unit 307, an interface unit 308, a memory 309, a processor 310, a power supply 311, and other components. Persons skilled in the art can understand that the structure of the user equipment shown in FIG. 6 does not constitute any limitation on the user equipment. The user equipment may include more or fewer components than those shown in the figure, or may combine some components, or may have a different component arrangement. In this embodiment of this disclosure, the user equipment includes but is not limited to a mobile phone, a tablet computer, a laptop computer, a palmtop computer, an in-vehicle terminal, a wearable device, a pedometer, and the like.

The processor 310 is configured to perform, in a case that a time domain resource for a random access message conflicts with a time domain resource indicated by a network-side message, any one of the following:

transmitting the random access message on the time domain resource for the random access message;

canceling transmission of the random access message;

delaying transmission of the random access message; or ignoring the network-side message.

Further, that a time domain resource for a random access message conflicts with a time domain resource indicated by a network-side message includes:

that the time domain resource for the random access message at least partially overlaps with at least one of the following resources indicated by the network-side message:

a downlink transmission resource; a downlink time domain resource; or a flexible time domain resource.

In a specific embodiment, the network-side message is DCI.

Further, the ignoring the network-side message includes any one of the following:

discarding the DCI; and skipping receiving a downlink transmission signal.

Further, the canceling transmission of the random access message includes:

in a case that a time gap between a time domain resource for receiving the DCI and a time domain resource for transmitting the random access message is greater than or equal to a preset threshold, canceling transmission of the random access message.

Further, the method further includes:

in a case that the time gap between the time domain resource for receiving the DCI and the time domain resource for transmitting the random access message is not greater than the preset threshold, transmitting the random access message on the time domain resource for the random access message.

Further, the time gap is duration from an end location of the time domain resource for receiving the DCI to any location of the time domain resource for transmitting the random access message.

Further, the delaying transmission of the random access message includes:

transmitting the random access message on a latest usable uplink time domain resource.

Further, the transmitting the random access message on the time domain resource for the random access message includes:

in a case that the time domain resource for the random access message is a flexible time domain resource indicated by a network-side message, transmitting the random access message on the time domain resource for the random access message.

Further, the random access message includes at least one of a random access channel PRACH or an uplink data channel PUSCH.

It should be understood that, in this embodiment of this disclosure, the radio frequency unit 301 may be configured to transmit or receive a signal in an information transmitting/receiving or call process, specifically, receives downlink data from a base station and then transmits the downlink data to the processor 310 for processing; and further, transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with other devices through a wireless communications system and a network.

The user equipment provides a user with wireless broadband Internet access by using the network module 302, for example, helps the user receive and send emails, browse web pages and access streaming media.

The audio output unit 303 may convert audio data received by the radio frequency unit 301 or the network module 302 or stored in the memory 309 into an audio signal and output the audio signal as a sound. Moreover, the audio output unit 303 may also provide an audio output (for example, a call signal reception sound or a message reception sound) related to a specific function implemented by the user equipment 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a static picture or a video that is obtained by an image capture apparatus (for example, a camera) in a video capture mode or an image capture mode. A processed image frame may be displayed on the display unit 306. An image frame processed by the graphics processing unit 3041 may be stored in the memory 309 (or another storage medium) or transmitted by the radio frequency unit 301 or the network module 302. The microphone 3042 may receive a sound and process this sound into audio data. In a telephone call mode, the processed audio data may be converted, for outputting, into a format in which the data may be transmitted to a mobile communication base station through the radio frequency unit 301.

The user equipment 300 further includes at least one sensor 305, for example, an optical sensor, a motion sensor and other sensors. Specifically, the optical sensor includes an ambient light sensor and a proximity sensor. The ambient light sensor may adjust luminance of a display panel 3031 based on brightness of ambient light. The proximity sensor may turn off the display panel 3031 and/or backlight when the user equipment 300 approaches an ear. As one type of motion sensor, an accelerometer sensor may detect magnitudes of accelerations in various directions (usually, three axes), may detect, in a still state, a magnitude and a direction of gravity, and may be configured to recognize a user equipment posture (for example, screen switching between a landscape mode and a portrait mode, related games, and magnetometer posture calibration), implement a vibration recognition related function (for example, a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by a user or information provided to a user. The display unit 306 may include the display panel 3031. The display panel 3031 may be configured in a form of a liquid crystal display (LCD), an organic light-emitting diode (OLED), or the like.

The user input unit 307 may be configured to receive entered digit or character information, and generate a key signal input related to user settings and function control of the user equipment. Specifically, the user input unit 307 includes a touch panel 3071 and other input devices 3072. The touch panel 3071, also referred to as a touchscreen, may capture a touch operation performed by a user on or near the touch panel 3071 (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch orientation of a user, detects a signal brought by the touch operation, and transmits the signal to the touch controller. The touch controller receives touch information from the touch detection apparatus, converts the touch information into touch point coordinates, transmits the touch point coordinates to the processor 310, and receives and executes a command transmitted by the processor 310. In addition, the touch panel 3071 may be implemented in various types, including a resistive type, a capacitive type, an infrared type, a surface acoustic wave type, or the like. In addition to the touch panel 3071, the user input unit 307 may further include other input devices 3072. Specifically, the other input devices 3072 may include but are not limited to a physical keyboard, a function key (for example, a volume control key and an on/off key), a trackball, a mouse and a joystick. Details are not described herein.

Further, the touch panel 3071 may cover the display panel 3031. When detecting a touch operation on or near the touch panel 3071, the touch panel 3071 transmits the touch operation to the processor 310 to determine the type of a touch event. Then, the processor 310 provides a corresponding visual output on the display panel 3031 based on the type of the touch event. In FIG. 6, the touch panel 3071 and the display panel 3031 are used as two independent parts to implement input and output functions of the user equipment. In some embodiments, however, the touch panel 3071 and the display panel 3031 may be integrated to implement the input and output functions of the user equipment. Details are not limited herein.

The interface unit 308 is an interface for connecting an external apparatus to the user equipment 300. For example, the external apparatus may include a wired or wireless headphone port, an external power (or battery charger) port, a wired or wireless data port, a memory card port, a port for connecting an apparatus that has an identification module, an audio input/output (I/O) port, a video I/O port, an earphone port, and the like. The interface unit 308 may be configured to receive an input (for example, data information or power) from the external apparatus and transmit the received input to one or more elements in the user equipment 300, and may alternatively be configured to transmit data between the user equipment 300 and the external apparatus.

The memory 309 may be configured to store software programs and various data. The memory 309 may mainly include a program storage region and a data storage region. The program storage region may store an operating system, an application program required for at least one function (for example, a sound play function and an image play function), and the like. The data storage region may store data (for example, audio data and a phone book) created based on use of a mobile phone, and the like. In addition, the memory 309 may include a high-speed random access memory, and may further include a non-volatile memory, for example, at least one disk storage device, a flash memory device, or other volatile solid-state storage devices.

The processor 310 is a control center of the user equipment, is connected to all parts of the entire user equipment by using various interfaces and lines, and runs or executes a software program and/or module stored in the memory 309 and invokes data stored in the memory 309, to implement various functions of the user equipment and process data, thereby monitoring the entire user equipment. The processor 310 may include one or more processing units. Optionally, the processor 310 may integrate an application processor and a modem processor. The application processor mainly processes an operating system, a user interface, an application program, and the like. The modem processor mainly processes wireless communication. It can be understood that the modem processor may alternatively be not integrated in the processor 310.

The user equipment 300 may further include the power supply 311 (for example, a battery) for supplying power to the components. Optionally, the power supply 311 may be logically connected to the processor 310 through a power management system, so as to implement functions such as charge management, discharge management and power consumption management through the power management system.

In addition, the user equipment 300 includes some functional modules not shown. Details are not described herein.

An embodiment of this disclosure further provides a computer-readable storage medium, where the computer-readable storage medium stores a computer program. When the computer program is executed by a processor, the steps of the foregoing random access method are implemented.

It can be understood that the embodiments described in this specification may be implemented by hardware, software, firmware, middleware, microcode, or a combination thereof. For hardware implementation, the processing unit may be implemented in one or more application-specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, other electronic units for implementing the functions described in this application, or a combination thereof.

For software implementation, the technologies described in this specification may be implemented through modules (for example, procedures and functions) that implement the functions described in this specification. Software codes may be stored in the memory and executed by the processor. The memory may be implemented inside or outside the processor.

All the embodiments in this specification are described in a progressive manner. Each embodiment focuses on differences from another embodiments. For the part that is the same or similar between different embodiments, reference may be made between the embodiments.

Persons skilled in the art should understand that the embodiments of this disclosure may be provided as a method, an apparatus, or a computer program product. Therefore, the embodiments of the present disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program codes.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of other programmable data processing user equipment to generate a machine, so that the instructions executed by a computer or a processor of other programmable data processing user equipment generate an apparatus for implementing a specific function in one or more processes in the flowcharts and/or in one or more blocks in the block diagrams.

These computer program instructions may alternatively be stored in a computer-readable memory that can direct the computer or other programmable data processing user equipment to work in a specific manner, so that the instructions stored in the computer-readable memory produce an artifact that includes an instruction apparatus. The instruction apparatus implements a specific function in one or more processes in the flowcharts and/or in one or more blocks in the block diagrams.

These computer program instructions may alternatively be loaded onto a computer or other programmable data processing user equipment, so that a series of operation steps are performed on the computer or the other programmable user equipment, to generate computer-implemented processing. Therefore, the instructions executed by the computer or the other programmable user equipment provide steps for implementing a specific function in one or more processes in the flowcharts and/or in one or more blocks in the block diagrams.

Although some optional embodiments in the embodiments of this disclosure have been described, persons skilled in the art can make further changes and modifications to these embodiments once they learn the basic inventive concept. Therefore, the appended claims are intended to be interpreted as covering the optional embodiments and all changes and modifications falling within the scope of the embodiments of this disclosure.

It should be further noted that in this specification, relational terms such as "first" and "second" are only used to distinguish one entity or operation from another entity or operation, but not necessarily require or imply that any actual relationship or sequence exists between these entities or operations. Moreover, the terms "include", "comprise", or any of their variants are intended to cover a non-exclusive inclusion, such that a process, a method, an article, or user equipment that includes a list of elements not only includes those elements but also includes other elements that are not expressly listed, or further includes elements inherent to such a process, method, article, or user equipment. In the absence of more restrictions, an element defined by "includes a . . . " does not preclude the existence of other identical elements in the process, method, article, or user equipment that includes the element.

The foregoing descriptions are merely optional implementations of this disclosure. It should be noted that a person of ordinary skill in the art may further make several improvements or polishing without departing from the principle of this disclosure and these improvements and polishing shall fall within the protection scope of this disclosure.

What is claimed is:

1. A random access method, applied to user equipment and comprising:
    in a case that a time domain resource for a random access message conflicts with a time domain resource indicated by a network-side message,
    canceling transmission of the random access message;
    wherein the network-side message is downlink control information (DCI);
    wherein the canceling transmission of the random access message comprises:
    in a case that a time gap between a time domain resource for receiving the DCI and a time domain resource for transmitting the random access message is greater than or equal to a preset threshold, canceling transmission of the random access message.

2. The random access method according to claim 1, further comprising:
    in a case that the time gap between the time domain resource for receiving the DCI and the time domain resource for transmitting the random access message is not greater than the preset threshold, transmitting the random access message on the time domain resource for the random access message.

3. The random access method according to claim 1, wherein the time gap is duration from an end location of the time domain resource for receiving the DCI to any location of the time domain resource for transmitting the random access message.

4. The random access method according to claim 1, wherein the random access message comprises at least one of a random access channel (PRACH) or an uplink data channel (PUSCH).

5. User equipment, comprising: a processor, a memory, and a computer program stored in the memory and capable of running on the processor, wherein when the computer program is executed by the processor, a random access method is implemented, and the random access method comprises:
    in a case that a time domain resource for a random access message conflicts with a time domain resource indicated by a network-side message,
    canceling transmission of the random access message;
    wherein the network-side message is downlink control information (DCI);
    wherein the canceling transmission of the random access message comprises:
    in a case that a time gap between a time domain resource for receiving the DCI and a time domain resource for transmitting the random access message is greater than or equal to a preset threshold, canceling transmission of the random access message.

6. The user equipment according to claim 5, further comprising:
    in a case that the time gap between the time domain resource for receiving the DCI and the time domain resource for transmitting the random access message is not greater than the preset threshold, transmitting the random access message on the time domain resource for the random access message.

7. The user equipment according to claim 5, wherein the time gap is duration from an end location of the time domain resource for receiving the DCI to any location of the time domain resource for transmitting the random access message.

8. The user equipment according to claim 5, wherein the random access message comprises at least one of a random access channel (PRACH) or an uplink data channel (PUSCH).

9. A non-transitory computer-readable storage medium, wherein the non-transitory computer-readable storage medium stores a computer program, and when the computer program is executed by a processor, a random access method is implemented, and the random access method comprises:
    in a case that a time domain resource for a random access message conflicts with a time domain resource indicated by a network-side message,
    canceling transmission of the random access message;
    wherein the network-side message is downlink control information (DCI);
    wherein the canceling transmission of the random access message comprises:
    in a case that a time gap between a time domain resource for receiving the DCI and a time domain resource for transmitting the random access message is greater than or equal to a preset threshold, canceling transmission of the random access message.

\* \* \* \* \*